United States Patent
Li et al.

(10) Patent No.: US 12,221,139 B2
(45) Date of Patent: Feb. 11, 2025

(54) BOX UNDERFRAME END STRUCTURE OF RAILWAY VEHICLE

(71) Applicant: CRRC Nanjing Puzhen Co., Ltd., Nanjing (CN)

(72) Inventors: Ming Li, Nanjing (CN); Rui Deng, Nanjing (CN); Yonghai Gao, Nanjing (CN); Fei Xiao, Nanjing (CN); Shixi Ou, Nanjing (CN); Yingbo Liu, Nanjing (CN); Shuai Li, Nanjing (CN)

(73) Assignee: CRRC Nanjing Puzhen Co., Ltd., Nanjing (CN)

( * ) Notice: Subject to any disclaimer, the term of this patent is extended or adjusted under 35 U.S.C. 154(b) by 781 days.

(21) Appl. No.: 17/598,908

(22) PCT Filed: Nov. 11, 2020

(86) PCT No.: PCT/CN2020/128076
§ 371 (c)(1),
(2) Date: Sep. 28, 2021

(87) PCT Pub. No.: WO2022/062109
PCT Pub. Date: Mar. 31, 2022

(65) Prior Publication Data
US 2022/0315068 A1 Oct. 6, 2022

(30) Foreign Application Priority Data
Sep. 24, 2020 (CN) .......................... 202011013455.9

(51) Int. Cl.
*B61F 1/10* (2006.01)
*B61F 1/08* (2006.01)
*B61F 1/12* (2006.01)

(52) U.S. Cl.
CPC .................. *B61F 1/10* (2013.01); *B61F 1/08* (2013.01); *B61F 1/12* (2013.01)

(58) Field of Classification Search
CPC ................. B61F 1/08; B61F 1/10; B61F 1/12
See application file for complete search history.

(56) References Cited

U.S. PATENT DOCUMENTS

| 4,778,098 | A | | 10/1988 | Rimbaud |
| 6,138,429 | A | * | 10/2000 | Baumgaertner ..... B62D 21/152 52/843 |

(Continued)

FOREIGN PATENT DOCUMENTS

| CN | 103832446 A | * | 6/2014 |
| CN | 106004911 A | | 10/2016 |

(Continued)

*Primary Examiner* — Zachary L Kuhfuss
(74) *Attorney, Agent, or Firm* — Bayramoglu Law Offices LLC

(57) ABSTRACT

A box underframe end structure of a railway vehicle includes an underframe boundary beam, an end beam, a front draft sill, and a coupler mounting seat, and further includes a rear end cross beam located on one side in a rear of the front draft sill, an end floor fixed between the end beam and the rear end cross beam, and a coupler cross beam fixed with the coupler mounting seat into a whole. A draft sill includes the front draft sill and a rear draft sill respectively arranged on a front side and a rear side of the coupler mounting seat. The coupler cross beam, the rear end cross beam, and the end floor are welded and fixed with the underframe boundary beam. The front draft sill, the rear draft sill, and the coupler cross beam are welded and fixed on a lower surface of the end floor.

17 Claims, 3 Drawing Sheets

(56) References Cited

U.S. PATENT DOCUMENTS

2007/0125739 A1* 6/2007 Hogbring ................ B61G 7/10
  213/75 R
2015/0047530 A1* 2/2015 Hirashima ................ B61F 1/00
  105/413

FOREIGN PATENT DOCUMENTS

| CN | 110304091 A | 10/2019 |
| CN | 110696864 A | 1/2020 |
| FR | 2529154 A1 | 12/1983 |

* cited by examiner

BOX UNDERFRAME END STRUCTURE OF RAILWAY VEHICLE

CROSS REFERENCE TO THE RELATED APPLICATIONS

This application is the national stage entry of International Application No. PCT/CN2020/128076, filed on Nov. 11, 2020, which is based upon and claims priority to Chinese Patent Application No. 202011013455.9 filed on Sep. 24, 2020, the entire contents of which are incorporated herein by reference.

TECHNICAL FIELD

The invention relates to a vehicle body structure of a railway vehicle, in particular to a large-bearing box underframe end structure.

BACKGROUND

In the 1990s, due to the urgent demand for urbanization development in China's cities, the internationally known advanced rail transit vehicle products began to be introduced into China, and the lightweight aluminum alloy vehicle body began to be widely used. Up to now, the end underframe structure of a vehicle body mainly has two forms. One adopts a draft, bolster and buffer structure to realize the connection of a coupler and a bogie and the transmission of force, and the other adopts a welded or casted coupler box riveted with an underframe boundary beam to realize the above-mentioned function.

At present, most underframe end structures of high-speed motor train units, subways, urban motor train units, and the like are draft, bolster and buffer type, which mainly includes a coupler seat, a draft sill, a sleeper beam, and the like. The draft, bolster, and buffer structure is complex itself, and meanwhile, it has a plurality of interfaces with the bogie, such as an empty spring, a vertical absorber, an anti-snake movement absorber, an anti-roll torsion bar, and the like. Besides, the form, position, and size requirements of the interface are high such that the manufacturing process is complex and the cost is high.

Chinese invention patent application CN201911058925.0 discloses a railway vehicle underframe structure, wherein an underframe end beam, an oblique supporting beam, a coupler supporting beam, and an underframe boundary beam form two quadrangular frame structures on two sides of a coupler mounting seat, and the four frame structures are used for bearing impact force, the underframe floor not being the main bearing structure. The longitudinal load of the vehicle is mainly transmitted to the boundary beam of the underframe through the oblique supporting beam and the coupler supporting beam. And the other part of the load is transmitted to the underframe floor through the drafting beam and then transmitted to the underframe boundary beam through the underframe floor. The underframe structure of the scheme has low bearing capacity, is mainly suitable for urban rail transit with low requirement for compression load, and is not suitable for urban motor train units, inter-city motor train units, and high-speed motor train units with high requirement for compression load.

SUMMARY

The invention mainly aims at solving the problems in the prior art, and provides a box underframe end structure of a railway vehicle. The end floor, the rear end cross beam, the coupler mounting seat, and the underframe boundary beam form six open "box" structures in the front, rear, left, and right of the coupler seat. The end floor is an important bearing component in the whole structure such that the underframe end structure has a large bearing capacity. And in the existing draft, bolster and buffer underframe structure, the problems of huge torque force caused by the fact that the front-mounted coupler mounting hole is located on the side face of the vertical plate of the draft sill and no operation space existing for mounting the traction seat of the bogie are solved.

In order to solve the above technical problems, The box underframe end structure of a railway vehicle provided by the invention comprises an underframe boundary beam, an end beam, a front draft sill, and a coupler mounting seat, and further comprises a rear end cross beam located on one side in the rear of the front draft sill, an end floor fixed between the end beam and the rear end cross beam, and a coupler cross beam fixed with the coupler mounting seat into a whole. The draft sill comprises the front draft sill and a rear draft sill respectively arranged on a front side and a rear side of the coupler mounting seat, the coupler cross beam, the rear end cross beam, and the end floor are all welded and fixed with the underframe boundary beam, and the front draft sill, the rear draft sill, and the coupler cross beam are welded and fixed on a lower surface of the end floor.

In addition, the invention also sets forth a railway vehicle, which is characterized by having the box underframe end structure of a railway vehicle described above.

The invention has beneficial effects as follows: the invention adopts a large-bearing box end structure formed by butt welding aluminum alloy profiles. The structure mainly comprises an end floor, a coupler seat, a front draft sill, a rear draft sill, a rear cross beam, a baseplate, and the like. It has no interface with a bogie, is simple in structure, and simple in the welding process. In the structure, the longitudinal force transmitted by the coupler is transmitted to the front draft sill and the rear draft sill through the coupler seat, then is transmitted to the rear end cross beam and the end floor through the front draft sill and the rear draft sill, and then is transmitted to the underframe boundary beam. The transverse force is mainly transmitted to the underframe boundary beam through the coupler seat cross beam, and meanwhile, the deformation of the floor generated by the bending moment can be effectively restrained by the rear cross beam. Based on a simple structure, sufficient strength is guaranteed. In the structure, compressing force >1500 KN and tensile force >1000 KN can be borne.

Figure 1:
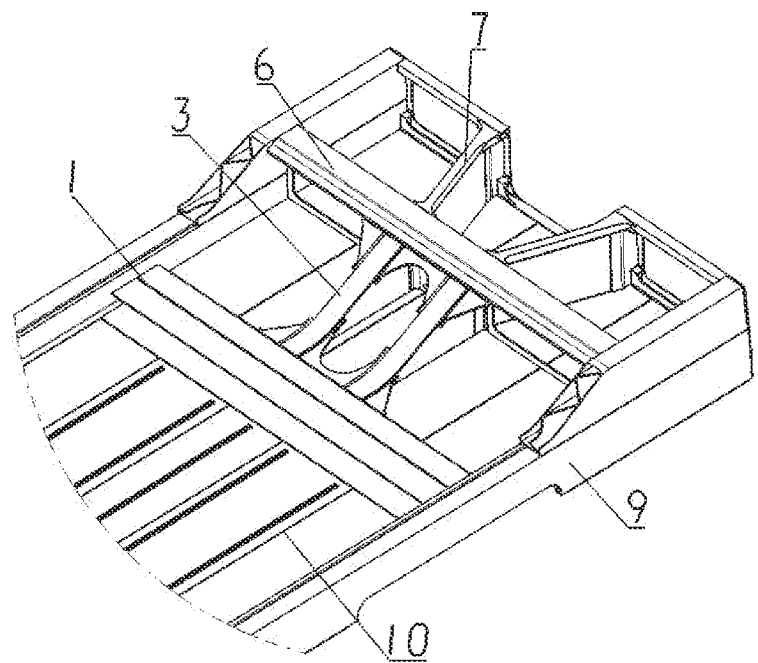
FIG. 1 is a schematic view of an underframe end structure of the present invention.

Reference numerals in the drawings are illustrated as follows: 1—rear end cross beam; 1a—first rear end cross beam; 1b—second rear end cross beam; 2—end floor; 3—rear draft sill; 3a—upper draft sill; 3b—lower draft sill; 4—lower boundary beam; 5—coupler mounting seat; 6—coupler cross beam; 7—front draft sill; 8—end beam composition; 9—underframe boundary beam; and 10—middle floor.

DETAILED DESCRIPTION OF THE EMBODIMENTS

Preferred embodiments of the present invention will be described in detail below with reference to the accompanying drawings.

Figure 2:
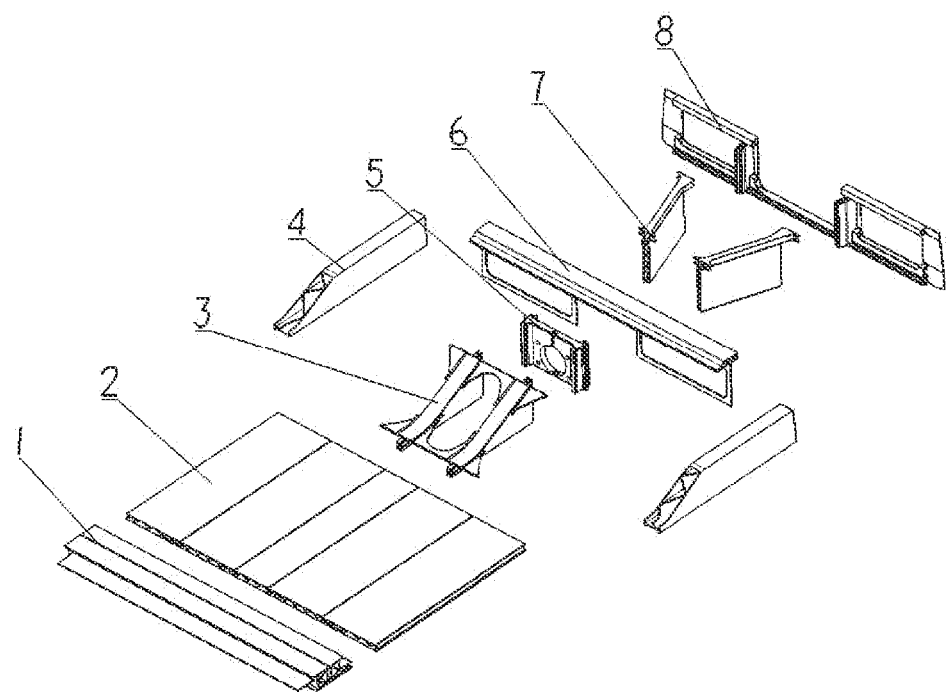
FIG. 2 is an exploded schematic view of an underframe end structure of the present invention.

As shown in FIGS. 1 and 2, a large-bearing box end underframe structure includes a rear end cross beam 1, an end floor 2, an underframe boundary beam 9, a lower boundary beam 4, an end beam 8, and a front draft sill 7, a coupler seat 5, a rear draft sill 3, and a coupler cross beam 6 located below the end floor 2. The components are connected by welding. Specifically, the lower boundary beam 4 and the underframe boundary beam 9 are assembled and welded to form an integral boundary beam. The end floor 2, the rear draft sill 3, the coupler seat 5, the coupler cross beam 6, the front draft sill 7, and the end beam 8 are assembled and welded into an end underframe module. The integral boundary beam and the end underframe module are assembled and welded to form a complete end underframe structure. The coupler cross beam 6, the rear end cross beam 1, and the end floor 2 are all welded and fixed with the underframe boundary beam 9, and the front draft sill 7, the rear draft sill 3, and the coupler cross beam 6 are welded and fixed on the lower surface of the end floor 2.

The end floor 2 is located between the end beam 8 and the rear end cross beam 1, and the front end and the rear end are respectively welded to the end beam 8 and the rear end cross beam 1. The coupler mounting seat 5 is welded and fixed at the central gap of the coupler cross beam 6. The front draft sill 7 and the rear draft sill 3 are respectively arranged on the front side and the rear side of the coupler mounting seat 5. The front draft sill 7 has two supporting plates extending outwards towards the front end, the included angle is about 40°, and the included angle can be adjusted according to design requirements. The front end of the supporting plate is welded to the end beam 8, and the rear end of the supporting plate is welded to the coupler cross beam 6 and the coupler mounting seat 5.

Figure 3:
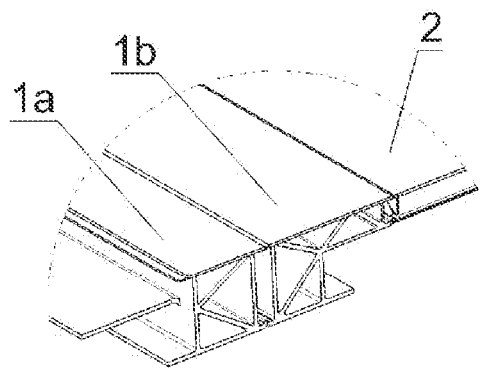
FIG. 3 is a schematic view showing the connection between a rear end cross beam and an end floor in an underframe end structure of the present invention.

As shown in FIG. 3, the rear end cross beam is formed by butt welding two front and rear hollow extruded profiles (a first rear end cross beam 1a and a second rear end cross beam 1b). The rear end cross beam may also be a single profile. The rear end cross beam is plugged with and then welded to the end floor 2 formed by butt welding of the profile.

Figure 4:
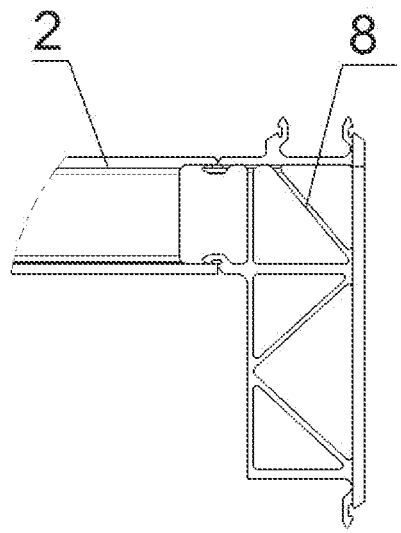
FIG. 4 is a schematic view showing the connection between an end floor and an end beam in an underframe end structure of the present invention.

As shown in FIG. 4, the end floor 2 is plugged with and then welded to the end beam 8, and the end floor 2 is simultaneously welded to the rear end cross beam 1 to form a flat plate structure.

Figure 5:
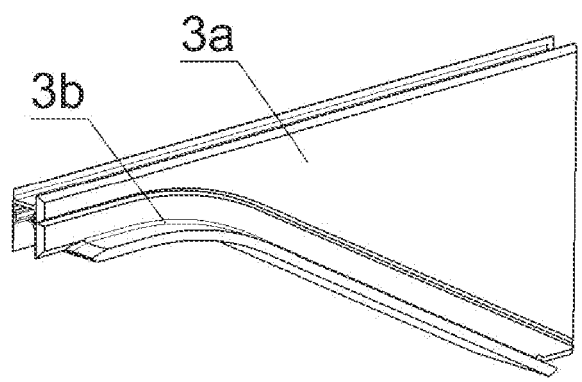
FIG. 5 is a schematic view showing the composition of a rear draft sill of an underframe end structure of the present invention.

As shown in FIG. 5, the rear draft sill 3 includes two longitudinally provided units each having an upper draft sill 3a and a lower draft sill 3b welded together. The top of the upper draft sill 3a is welded to the end floor 2, and the front of the upper draft sill 3a is welded to the coupler mounting seat 5.

Figure 6:
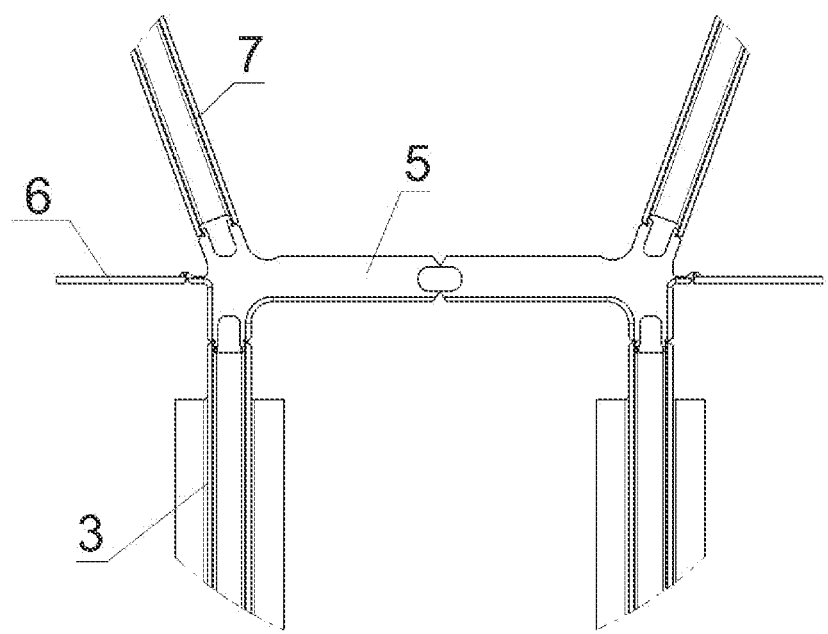
FIG. 6 is a schematic view showing the connection of a coupler seat and a front and rear draft sill in an underframe end structure of the present invention.

As shown in FIG. 6, the coupler seat 5, formed by butt welding two profiles, is plugged with and then welded to the front draft sill 7 and the rear draft sill 3, and is welded to two front draft sills 7 to form a horn mouth structure.

In the underframe end structure of the embodiment, the connections between the front draft sill 7 and the end floor 2, and the rear draft sill 3 and the end floor 2 are both full penetration T-joint, and the bearing capacity of the welding seam is high. The rear end cross beam 1 and the underframe boundary beam 9 have long vertical welding seam and can bear additional bending moment generated by longitudinal loads (compression: >1500KN; tensility>1000KN) acting on coupler seat 5.

The middle floor 10 of the underframe end structure of the present invention is a non-through-long floor and extends only to the rear end cross beam 1. The end floor 2, the rear end cross beam 1, the rear draft sill 3, and the underframe boundary beam 9 form six open "box" structures at the front, rear, left and right of the coupler mounting seat 5, and the end floor 2 is an important bearing component in the whole structure. The longitudinal load of the vehicle is mainly transmitted to the end floor 2 through the front draft sill 7 and the rear draft sill 3, and then uniformly transmitted to the undercarriage boundary beam through the end floor 2.

The underframe end structure of the invention can meet the requirements that the compression load is not lower than 1500 kN and the tensile load is not lower than 1000 kN. That is, the requirements of urban rail transit can be met, and the requirements of urban motor train units, inter-city motor train units, and high-speed motor train units can also be met.

In addition to the embodiments described above, other preferred embodiments of the invention are possible. All technical schemes formed by equivalent replacements or equivalent transformations fall within the scope of the present invention.

What is claimed is:

1. A box underframe end structure of a railway vehicle, comprising
    an underframe boundary beam,
    an end beam,
    a front draft sill,
    a coupler mounting seat,
    a rear end cross beam located on one side in a rear of the front draft sill,
    an end floor fixed between the end beam and the rear end cross beam, and
    a coupler cross beam fixed with the coupler mounting seat into a whole, wherein
        a draft sill comprises the front draft sill and a rear draft sill respectively arranged on a front side and a rear side of the coupler mounting seat,
        the coupler cross beam, the rear end cross beam, and the end floor are welded and fixed with underframe boundary beam, and
        the front draft sill, the rear draft sill, and the coupler cross beam are welded and fixed on a lower surface of the end floor, wherein the underframe boundary beam comprises a lower boundary beam located below the underframe boundary beam and close to one side of the end beam, and a left end and right end of the coupler cross beam and the end beam are welded on an inner side of the lower boundary beam.

2. The box underframe end structure according to claim 1, wherein the front draft sill has two supporting plates extending outwards towards a front end, the front end of each supporting plate is welded to the end beam, and a rear end of the each supporting plate is welded to the coupler cross beam and the coupler mounting seat.

3. The box underframe end structure according to claim 1, wherein the rear draft sill comprises two longitudinally provided units, each longitudinally provided unit having an upper draft sill and a lower draft sill, wherein the upper draft sill and the lower draft sill are welded into a whole, a top of the upper draft sill is welded to the end floor, and a front of the upper draft sill is welded to the coupler mounting seat.

4. The box underframe end structure according to claim 1, wherein the rear end cross beam is a single hollow extruded profile or the rear end cross beam is formed by butt welding two front and rear hollow extruded profiles.

5. The box underframe end structure according to claim 1, wherein a coupler hole is formed in a middle of the end beam, and welding interfaces for welding the front draft sill are provided in a rear of two sides of the coupler hole.

6. The box underframe end structure according to claim 1, wherein welding interfaces for welding the front draft sill and the rear draft sill are respectively provided on the front side and the rear side of the coupler mounting seat.

7. The box underframe end structure according to claim 1, wherein a front end of a middle floor of the railway vehicle is welded and fixed with a rear end face of the rear end cross beam.

8. The box underframe end structure according to claim 1, wherein the lower boundary beam and the underframe boundary beam are assembled and welded to form an integral boundary beam; the end floor, the rear draft sill, the coupler mounting seat, the coupler cross beam, the front draft sill, and the end beam are assembled and welded into an end underframe module; and the end underframe module and the integral boundary beam are assembled and welded into a complete end underframe structure.

9. A railway vehicle, comprising the box underframe end structure of the railway vehicle according to claim 1.

10. The railway vehicle according to claim 9, wherein the underframe boundary beam comprises a lower boundary beam located below the underframe boundary beam and close to one side of the end beam, and a left end and right end of the coupler cross beam and the end beam are welded on an inner side of the lower boundary beam.

11. The railway vehicle according to claim 10, wherein the lower boundary beam and the underframe boundary beam are assembled and welded to form an integral boundary beam; the end floor, the rear draft sill, the coupler mounting seat, the coupler cross beam, the front draft sill, and the end beam are assembled and welded into an end underframe module; and the end underframe module and the integral boundary beam are assembled and welded into a complete end underframe structure.

12. The railway vehicle according to claim 9, wherein the front draft sill has two supporting plates extending outwards towards a front end, the front end of each supporting plate is welded to the end beam, and a rear end of the each supporting plate is welded to the coupler cross beam and the coupler mounting seat.

13. The railway vehicle according to claim 9, wherein the rear draft sill comprises two longitudinally provided units, each longitudinally provided unit having an upper draft sill and a lower draft sill, wherein the upper draft sill and the lower draft sill are welded into a whole, a top of the upper draft sill is welded to the end floor, and a front of the upper draft sill is welded to the coupler mounting seat.

14. The railway vehicle according to claim 9, wherein the rear end cross beam is a single hollow extruded profile or the rear end cross beam is formed by butt welding two front and rear hollow extruded profiles.

15. The railway vehicle according to claim 9, wherein a coupler hole is formed in a middle of the end beam, and welding interfaces for welding the front draft sill are provided in a rear of two sides of the coupler hole.

16. The railway vehicle according to claim 9, wherein welding interfaces for welding the front draft sill and the rear draft sill are respectively provided on the front side and the rear side of the coupler mounting seat.

17. The railway vehicle according to claim 9, wherein a front end of a middle floor of the railway vehicle is welded and fixed with a rear end face of the rear end cross beam.

\* \* \* \* \*